United States Patent Office 2,894,026
Patented July 7, 1959

2,894,026

PURIFICATION OF LYSINE

Norman L. Hause, West Chester, Pa., William R. Schmitz and Marcus A. Stevens, Wilmington, Del., and Walter L. Sutor, Grand Island, N.Y., assignors to E. I. du Pont de Nemours & Company, Wilmington, Del., a corporation of Delaware No Drawing. Application August 1, 1956
Serial No. 601,344

13 Claims. (Cl. 260—534)

This invention relates to the purification of lysine and more particularly to a method for removing various amine impurities from aqueous solutions of lysine.

A known method of synthesizing lysine involves reacting a 5-(4-halobutyl)hydantoin (e.g., the chloro or bromo compound) with ammonia and hydrolyzing the resulting mixture of products with an aqueous solution of a strong acid or base. Various secondary and tertiary amino compounds which are substituted hydantoins are formed as by-products of the reaction of the halobutylhydantoin with ammonia. In the hydrolysis reaction to produce lysine, the above by-products hydrolyze to by-product amino acids which contaminate the lysine. These contaminants generally include secondary and tertiary amines such as di-(5-amino-5-carboxypentyl)amine and tri-(5-amino-5-carboxypentyl)amine.

The above amine type impurities are formed along with lysine in most syntheses of lysine. Since they are not nutritionally useful, their presence in lysine is generally objectionable. However, no practical way has been known for removing small amounts of such impurities by usual fractional crystallization methods.

It is an object of the invention to provide a practical method for effectively removing or separating such amine impurities from lysine. Another object is to provide a method for purifying aqueous solutions of lysine contaminated by such impurities. A still further object is to provide a purification method for removing the impurities which involves absorbing lysine and the impurities on a cation-exchange resin and selectively eluting the impurities from the resin. Still further objects will be apparent from the following description.

Lysine is primary amine whereas di-(5-amino-5-carboxypentyl)amine and tri-(5-amino-5-carboxypentyl)-amine, respectively, are secondary and tertiary amines. Since secondary and tertiary amines are generally more basic than the corresponding primary amines, they would be expected to resist more strongly than lysine elution from a cation-exchange resin upon which they had been adsorbed.

Contrary to such expectation it has now been found that when lysine and the above secondary and tertiary amine type impurities are adsorbed on a cation-exchange resin, the impurities can be preferentially eluted from the resin provided a suitable eluting agent is used. It has been further discovered that such preferential elution can be carried out to separate the impurities from lysine while permitting recovery in high yield of lysine relatively free of such impurities.

Based upon the above discoveries, the objects of the invention are accomplished by passing an aqueous solution of lysine containing amine impurities of the above type through a bed of a cation-exchange resin having strongly acidic functional groups, which resin is in its acid or ammonium form, to effect adsorption on the resin of both the lysine and the impurities, then selectively eluting the impurities from the resin with dilute aqueous ammonia through an unloaded portion of the resin bed in the ammonium form. The lysine remaining adsorbed on the resin is subsequently eluted employing well-known eluting agents and can be recovered from the eluate in any desired manner.

The preferred agent for selectively or preferentially eluting the amine impurities from the resin bed on which the lysine and the impurities have been adsorbed is aqueous ammonia of 0.1 to 0.7% strength (percent $NH_3$). Aqueous ammonia of strengths as low as 0.01% or lower can be used but are generally not preferred because of the slower rate at which elution of the impurities occurs. Aqueous ammonia of strengths greater than 0.7%, e.g., up to 2.0%, can also be used but at such higher strengths separation between the lysine and the impurities is not as effective as when aqueous ammonia of strengths in the preferred range are used. At ammonia strengths substantially greater than 2.0%, elution of the impurities is not sufficiently selective to be practical.

Elution of the impurities with the dilute aqueous ammonia should be effected through an unloaded portion of the resin bed, or through another unloaded bed of the resin. In general, such unloaded portion of the bed should be at least one-third the length of the portion of the bed from which the impurities are eluted, i.e., at least one-third the length of the loaded portion of the bed. If elution is not effected through an effective length of unloaded bed, elution of the impurities will not be sufficiently selective and substantial loss of lysine into the effluent will result. However, the effective minimum length of the unloaded portion of the bed will depend somewhat upon the particle size of the resin used. With resin of very small particle size, elution of the impurities may be sufficiently selective if effected through a length of unloaded bed substantially less than one-third the length of the loaded bed. With beds of resin of usual commercial particle size ranges, e.g. 20 to 100 mesh (U.S. Standard screen scale), most preferably 20 to 50 mesh, it is preferred to effect elution through unloaded bed of from one to two times the length of the loaded bed. Greater lengths of unloaded bed can be used but generally offer no added advantage.

In a preferred embodiment of the invention, the resin system will comprise two or more resin columns. In use, the impure lysine solution is passed through the first column only until that column is loaded with lysine and the impurities. The latter are then eluted from the first column through the second column so that most of the lysine is transported during the elution period to the second column while the secondary and tertiary amine type impurities are carrier through by the effluent from the second column. In such a system, the second column constitutes the unloaded portion of the bed through which elution of the impurities is effected.

The invention is specifically illustrated by the following examples in which all percentages are by weight.

Example 1

An aqueous solution (3 liters) of L-lysine L-glutamate (equivalent to 327 g. of lysine) containing di- and tri-(5-amino-5-carboxypentyl)amine glutamates (the secondary amine content was about 1.6% of the weight of lysine present while the tertiary amine was present in considerably smaller amounts) and other amine glutamate impurities, was fed through a column of a cation-exchange resin ($NH_4^+$ form) 6 feet high and 1.8 in. in diameter. The resin was a commercial, 50–100 mesh (U.S. Standard screen scale) sulfonated copolymer of styrene with about 8% of divinyl benzene. The column adsorbed from the solution lysine and the various amine impurities while the glutamic acid component appeared in the effluent as ammonium glutamate. The column was then eluted with 0.2% aqueous ammonia at the rate of 0.57 gal./min./sq.

ft. of column cross-section, until lysine began to appear in the effluent. This required 2.26 liters of the aqueous ammonia wash solution. The effluent from the wash solution contained 88% of the amine impurities originally present with the lysine. Elution of the lysine retained on the column with 20% aqueous ammonia gave a lysine effluent solution containing only about 0.2% of di-(5-amino-5-carboxypentyl)amine (based on the weight of lysine present) and practically no tri-(5-amino-5-carboxypentyl)amine. No other impurities could be detected in the purified lysine solution using chromatographic analysis.

The impure lysine glutamate used in the above example was obtained during the resolution (L-glutamic acid as resolving agent) of impure DL-lysine resulting from the hydrolysis of the products of the reaction of 5-(4-chlorobutyl)hydantoin with ammonia.

Example 2

Three vertical columns (A, B and C) of a cation-exchange resin ($NH_4^+$ form) of the type used in Example 1 but of 20 to 50 mesh size were connected so that liquid run through column A could be either run out of the bottom thereof or run to the top of column B, and so that liquid run through column B could be either run out of the bottom thereof or run to the top of column C. Columns A, B and C were each 2.36 in. in diameter with heights, respectively of 3.5 ft., 6 ft. and 3.5 ft.

An acid hydrolyzate (using hydrochloric acid as the hydrolyzing agent) of the mixed products of the reaction of 5-(4-chlorobutyl)hydantoin with ammonia was passed over a weakly basic anion-exchange resin (free amine form) to obtain 5.87 kg. of an aqueous solution of lysine (240 g.), di-(5-amino-5-carboxypentyl)amine (5% of the weight of lysine present), tri-(5-amino-5-carboxypentyl)amine (less than 1% of the weight of lysine present) and various other impurities including ammonium chloride and some unhydrolyzed hydantoins. This solution was fed through columns A and B in series, after which the three columns were connected in series and eluted with 3.39 liters of 0.3% aqueous ammonia at the rate of 0.74 gal./min./sq. ft. of column cross-section. At that point, lysine began to appear in the effluent from column C while 98% of the total di- and tri-(5-amino-5-carboxypentyl)amines had been eluted from the columns. Also at this point, column A contained a mixture of various amine impurities (mostly incompletely hydrolyzed hydantoin compounds) and about 2.8% of the original lysine; column B contained 91.8% of the original lysine contaminated with about 0.1% of di-(5-amino-5-carboxypentyl)amine and virtually no tri-(5-amino-5-carboxypentyl)amine; and column C contained 5.4% of the original lysine contaminated with a trace of di-(5-amino-5-carboxypentyl)amine. The lysine solution obtained by eluting the adsorbed lysine from columns B and C with 20% aqueous ammonia contained less than 0.1% of di-(5-amino-5-carboxypentyl)amine impurity based on the weight of lysine present.

The above three-column system can be operated by first feeding the crude lysine solution and eluting with dilute aqueous ammonia as described in Example 2, and then eluting the lysine from column B only with concentrated aqueous ammonia. In the next cycle, the feeding is carried out through columns C and B and A in that order, following which only the lysine from column B is again eluted with concentrated (e.g. about 20%) aqueous ammonia. The feeding and elutions in the next cycle would be the same as in the first cycle. After a few cycles of such operations, a build-up of strongly adsorbed impurties (chiefly unhydrolyzed hydantoins) takes place on columns A and C. These can be eluted with still more concentrated (e.g. 27%) aqueous ammonia and re-hydrolyzed, and the cyclic operation of the three-column resin system is resumed. Also in this type of operation, the lysine loading becomes heaviest on column B which is the column that is eluted to recover the lysine.

Example 3

Two vertical resin columns, each 6 ft. high and 2.36 in. in diameter, composed of 20–50 mesh resin ($NH_4^+$ form) of the type used in Example 1 were connected so that liquid could be run through the columns in series. An impure aqueous 4.1% lysine solution containing 180 g. of lysine and having a composition similar to that of the feed solution of Example 2 was fed to the two-column system. A 0.3% solution of aqueous ammonia (5.7 liters) was then passed through the columns at a rate of 0.74 gal./min./sq. ft of column cross-section until lysine began to appear in the effluent. At that point the first column was found to have retained 80% and the second column 20% of the lysine originally fed. The lysine solution obtained by eluting the two columns with concentrated ammonia contained di-(5-amino-5-carboxypentyl)amine equal to 0.3% of the weight of the lysine present and virtually no tri-(5-amino-5-carboxypentyl)amine. The effluent obtained from the passage of the 0.3% aqueous ammonia through the columns contained 94% of the di- and tri-(5-amino-5-carboxypentyl)amines originally present with the lysine.

Example 4

Two vertical resin columns, each 6 ft. high and 1 in. in diameter, were connected so that liquid passed up or down the first could be passed down the second. The resin ($NH_4^+$ form) in each column was of 20 to 50 mesh size and the same type used in Example 1. An acid lysine hydrolyzate solution of about the same purity as that used in Example 2 and diluted until the hydrochloric acid concentration was 4% was passed down through the first column at a rate of 0.8 gal./min./sq. ft. of column cross-section until this column was loaded with lysine. This caused most of the resin in the first column to be converted to the acid form. The ammonium chloride formed passed on in the effluent. Lysine, incompletely hydrolyzed hydantoins, di- and tri-(5-amino-5-carboxypentyl)amines and other impurities such as $\alpha$-amino-epsilon-hydroxycaproic acid and pipecolic acid were adsorbed. After washing with water, the first column was neutralized by slowly passing 1.8 bed volumes of 1% aqueous ammonia up through the column at a rate of 0.8 gal./min./sq. ft. of column cross-section. A hot spot (indicating the neutralization front) moved up the column during the neutralization and when it neared the top, the strength of the aqueous ammonia was changed to 0.3% and the columns were connected to pass the effluent from the first column down the second column. Four bed volumes of 0.3% aqueous ammonia were used. The first materials breaking through the second column were $\alpha$-amino-epsilon-hydroxycaproic and pipecolic acids. Subsequent fractions contained di- and tri-(5-amino-5-carboxypentyl)amines equal to 4.5% of the basic titer of the basic amino acids initially adsorbed. At the point where lysine began to break through, the feeding of 0.3% aqueous ammonia was discontinued and the lysine was eluted separately from the two columns with 20% aqueous ammonia. The basic titers of the lysine found on the first and second columns were respectively 5% and 90.5% of the basic titer of the basic amino acids originally fed to the columns. The lysine eluted from the second column contained less than 0.1% of di-(5-amino-5-carboxypentyl)amine and no detectable amount of tri-(5-amino-5-carboxypentyl)amine.

Example 5

Two vertical columns of a cation-exchange resin of the kind used in Example 1 were used to recover purified lysine from diluted acid hydrolyzate similar to that described in Example 4. Each of the two columns was of the same diameter and 8 ft. high. The resin in both columns was initially in the ammonium form. Provisions were made for feeding liquid to either column, for passing effluent from either column to waste, for feeding effluent from the first column through the second column, and for recycling various cuts of the effluent from the second column as feed to the first column.

In the first cycle 0.5 bed volume (BV) of 4% hydrochloric acid, 0.4 BV of water, 4 to 6 BV of the diluted acid hydrolyzate, 0.4 BV of water an 0.35 BV of a cut (recycle A) of the effluent from the second column in a previous cycle, were fed in series and in the order specified to the first column at a rate of about 3 gal./min./sq. ft. of column cross-section. The term "bed volume" (BV) is used to represent the volume ($\pi r^2 h$ where $h$ is the height of the bed) of the first column of the two-column system.

During the passage of all of the above streams, the effluent from the first column was passed to waste. Prior to the feeding of recycle A, the resin in the first column was principally in the acid form and the effluent was acidic, whereas after the feeding of recycle A, the first column was partly reconverted to the ammonium form. After the feeding of recycle A, the two columns were connected so that effluent from the first served as feed for the second. Then, 0.9% aqueous ammonia was fed to the first column until its effluent turned basic. At this point 1.1 BV of 0.2% aqueous ammonia was fed to the two columns in series at the rate of 1.68 gal./min./sq. ft. of column cross-section. This was followed in sequence by 0.66 BV of recycle B at 2 gal./min./sq. ft., 0.84 BV of recycle C at 3 gal./min./sq. ft., 0.8 BV of 20% aqueous ammonia at 1 gal./min./sq. ft. and 0.4 BV of water at 1 gal./min./sq. ft. Recycles B and C were further cuts of the effluent from the second column in a previous cycle, as will be explained more fully below.

At this point the connection between the two columns was shut off and the first column was washed to waste, backwashed, then drained to place it in condition for use in the next cycle.

During the above operations when the columns were connected together, the effluent from the second column was sent to waste until lysine began to appear in the effluent. The effluent sent to waste (3 BV) contained over 90% of the organic impurities originally present with the lysine in the hydrolyzate feed. The impurities so discarded included all of the pipecolic acid, most of the α-amino-epsilon-hydroxycaproic acid, and about 80% of the di- and tri-(5-amino-5-carboxypentyl)amine impurities. After the first appearance of lysine in the effluent from the second column, the effluent was separated into various cuts and saved.

The first effluent cut of 0.35 BV contained 1% $NH_3$, a small amount of lysine and a moderate amount of organic impurities. This cut served as recycle A for the next cycle of operation.

The second effluent cut of 1.32 BV contained about 8% $NH_3$, most of the lysine and traces of organic impurities. Half of this cut served as recycle B for the next cycle, while the remainder was removed as product stream. The lysine was obtained from the latter with a recovery better than 98% at a purity of 99%.

The third effluent cut of 0.84% BV contained a small amount of lysine and about 14% ammonia. It served as recycle C for the next cycle.

The two columns were connected together while all of the above first and second cuts but only while part of the third cut were collected. Most of the third cut was collected while the connection between the two columns was shut off and while water was being fed to the second column.

Following collection of the above cuts, the second column was washed to waste, backwashed and drained to place it in condition for use in the next cycle. The above cycle of operations was then repeated several times with similar results.

Recycling of recycle A is advantageous in that it serves partially to neutralize the first column after feeding the acid hydrolyzate. Recycling of recycles B and C is advantageous since with their relatively high ammonia contents they serve to elute lysine.

Rates of flow of the solutions through the resin columns are not critical but should generally not be so great as to cause channeling in the columns. In particular, channeling should be avoided when eluting impurities with the dilute aqueous ammonia so as not to reduce effectiveness of impurity separation. Flow rates of 1 to 2 gal./min./sq. ft. of column cross-section are suitable but lower and higher rates, e.g., up to about 3 gal./min./sq. ft. or greater can be used.

Temperature is not a critical factor in practicing the present method. Temperatures below room temperature are usable but offer no advantages. Higher temperatures up to the normal boiling points of the solutions (or higher if operated under pressure) are also usable. The operations illustrated by the examples were carried out at about room temperature.

As previously stated, the aqueous ammonia used to elute selectively the amine impurities and leave the lysine retained on the resin should be of a strength not exceeding 2.0%. Aqueous ammonia of greater strength, e.g., 5% up to 29%, is preferably employed for subsequently eluting the lysine in order to shorten the elution time and avoid excessive dilution of the purified lysine solution. Aqueous ammonia of strength within this range but not exceeding about 20% will elute lysine in preference to those impurities which are more strongly adsorbed than lysine, such as the small amounts of unhydrolyzed hydantoin impurities. As these latter tend to build up, generally on the forepart of the resin system, they can periodically be eluted by more concentrated, e.g., above about 25%, aqueous ammonia. Thus, by controlling the concentration of the eluting agent during the various elution stages, the less firmly adsorbed impurities (such as the di- and tri-(5-amino-5-carboxypentyl)amines), lysine, and the above more firmly adsorbed impurities can be readily and separately eluted.

Any of the common cation-exchange resins having strongly acidic functional groups such as the sulfonic acid, phosphonic acid or phosphonous acid groups, are suitable for the present purpose. The resin can initially be in either the acid ($H^+$) or ammonium ($NH_4^+$) form. If initially in the acid form, it will be converted to the ammonium form during the elutions with aqueous ammonia. The preferred resins are those of the sulfonic acid types such as the sulfonated coals, the sulfonated phenol-aldehyde resins and the nuclear sulfonated aromatic hydrocarbon resins. The nuclear sulfonated aromatic hydrocarbon cross-linked resins such as the sulfonated copolymers of a monovinylbenzene and a polyvinylbenzene, particularly sulfonated styrene-divinylbenzene copolymers having the equivalent of from 4 to 16% divinylbenzene which serves as a cross-linking agent, are most preferred. The resin will be used in particulate form and those of the usual particle sizes ranging from about 20 to 100 mesh (U.S. Standard screen scale), most preferably 20 to 50 mesh, will generally be used.

It will be seen from the foregoing description and specific examples that the invention provides a simple, highly effective and cheap way of separating lysine from various amine impurities normally associated with synthetically obtained lysine. The method can be effectively used to purify aqueous lysine solutions containing such impurities, regardless of the source of such solutions.

We claim:

1. The method of purifying an aqueous solution of lysine containing amine impurities including the secondary and tertiary amines, di-(5-amino-5-carboxypentyl)amine and tri-(5-amino-5-carboxypentyl)amine, said method comprising passing said solution through a bed of a strongly acidic cation-exchange resin, whereby said lysine and said secondary and tertiary amine impurities are loaded on the bed, selectively eluting said secondary and tertiary amine impurities from the resin with aqueous ammonia of 0.01 to 2% strength, and subsequently eluting the lysine from the resin.

2. The method of purifying an aqueous solution of lysine containing amine impurities including the secondary and tertiary amines, di-(5-amino-5-carboxypentyl)amine and tri-(5-amino-5-carboxypentyl)amine, said method comprising passing said solution through a bed of a strongly acidic cation-exchange resin whereby said lysine and said impurities are loaded on the bed, selectively eluting said secondary and tertiary amines from the resin with aqueous ammonia of a strength not exceeding 2%, said elution being effected through an unloaded portion of said bed, and subsequently eluting lysine from the resin.

3. The method of purifying an aqueous lysine solution containing amine impurities including the secondary and tertiary amines, di-(5-amino-5-carboxypentyl)amine and tri-(5-amino-5-carboxypentyl)amine, said method comprising passing said solution through a bed of a strongly acidic cation-exchange resin whereby said lysine and said impurities are loaded on a portion of said bed, selectively eluting said secondary and tertiary amines from the resin with aqueous ammonia of a strength of 0.01 to 2%, said elution being effected through an unloaded portion of the bed at least one-third the length of the loaded portion, and subsequently eluting lysine from the resin.

4. The method of claim 3 wherein the secondary and tertiary amines are eluted with aqueous ammonia of a strength of 0.1 to 0.7% and the lysine is subsequently eluted with aqueous ammonia of a strength of at least 5%.

5. The method of claim 3 wherein the cation-exchange resin is in its ammonium form.

6. The method comprising passing an aqueous solution of lysine containing amine impurities including di-(5-amino-5-carboxypentyl)amine and tri-(5-amino-5-carboxypentyl)amine through a column of a cation-exchange resin in its ammonium form whereby said lysine and said impurities are adsorbed on said column, passing aqueous ammonia of 0.1 to 0.7% strength through said column and then through a second column of a cation-exchange resin in ammonium form until lysine begins to appear in the effluent from said second column, then eluting lysine from said columns with aqueous ammonia of at least 5% strength.

7. The method of purifying an impure aqueous solution of lysine containing impurities including di-(5-amino-5-carboxypentyl)-amine and tri-(5-amino-5-carboxypentyl)amine, comprising establishing a three-column cation-exchange system in which the exchange resin in each column is the ammonium form of a strongly acidic cation-exchange resin; in a first cycle, passing said impure lysine solution through the first and second of said columns in series to load the same with lysine and said impurities, passing aqueous ammonia of 0.1 to 0.7% strength through the first, second and third columns in that order in series until lysine begins to appear in the effluent from the third column, then eluting lysine from the second column with aqueous ammonia of a strength of at least 5%; in a second cycle, passing said impure lysine solution through said third and second columns in series to load the same with lysine and said impurities, passing aqueous ammonia of 0.1 to 0.7% strength through said third, second and first columns in that order in series until lysine begins to appear in the effluent from said first column, then eluting lysine from said second column with aqueous ammonia of at least 5% strength; and repeating said first and second cycles in the order named.

8. The method of claim 7 wherein the impure lysine solution also contains amine-hydantoin impurities, the lysine is eluted in each cycle from the second column by means of aqueous ammonia of 5 to 20% strength; and wherein after repetition of the cycles a number of times, the first and third columns are eluted with aqueous ammonia of strength greater than 25% and repetition of the cycles is then continued.

9. The method comprising passing an aqueous acid hydrolyzate of the mixed products of the reaction of ammonia with a compound of the group consisting of 5-(4-chlorobutyl)hydantoin and 5-(4-bromobutyl)hydantoin, through a column of a strongly acidic cation-exchange resin in its ammonium form whereby said lysine and amine impurities in said hydrolyzate are adsorbed on said resin and said resin is partially converted to its acid form, neutralizing said resin with aqueous ammonia, then eluting said column with aqueous ammonia of 0.1 to 0.7% strength and passing the effluent from said column through a second column of said cation-exchange material in its ammonium form, said elution being continued until lysine begins to appear in the effluent from said second column, and then eluting lysine from said columns with aqueous ammonia of at least 5% strength.

10. The method comprising repeating the steps of claim 9 a number of times using the same resin columns in each repetition and employing aqueous ammonia of 5 to 20% strength for eluting lysine in each repetition of said steps, then eluting at least the first of said columns with aqueous ammonia of at least 25% strength and subsequently employing said columns in further repetitions of the steps of claim 9.

11. The method of claim 6 wherein the cation-exchange resin is a nuclear sulfonated aromatic hydrocarbon cross-linked resin.

12. The method of claim 7 wherein the cation-exchange resin is a nuclear sulfonated aromatic hydrocarbon cross-linked resin.

13. The method of claim 9 wherein the cation-exchange resin is a nuclear sulfonated aromatic hydrocarbon cross-linked resin.

References Cited in the file of this patent

UNITED STATES PATENTS

| 2,387,824 | Block | Oct. 30, 1945 |
| 2,586,154 | Emmick | Feb. 19, 1952 |

OTHER REFERENCES

Block: Archives of Biochem, vol. 11 (1946), pp. 235–48.